Patented Mar. 9, 1948

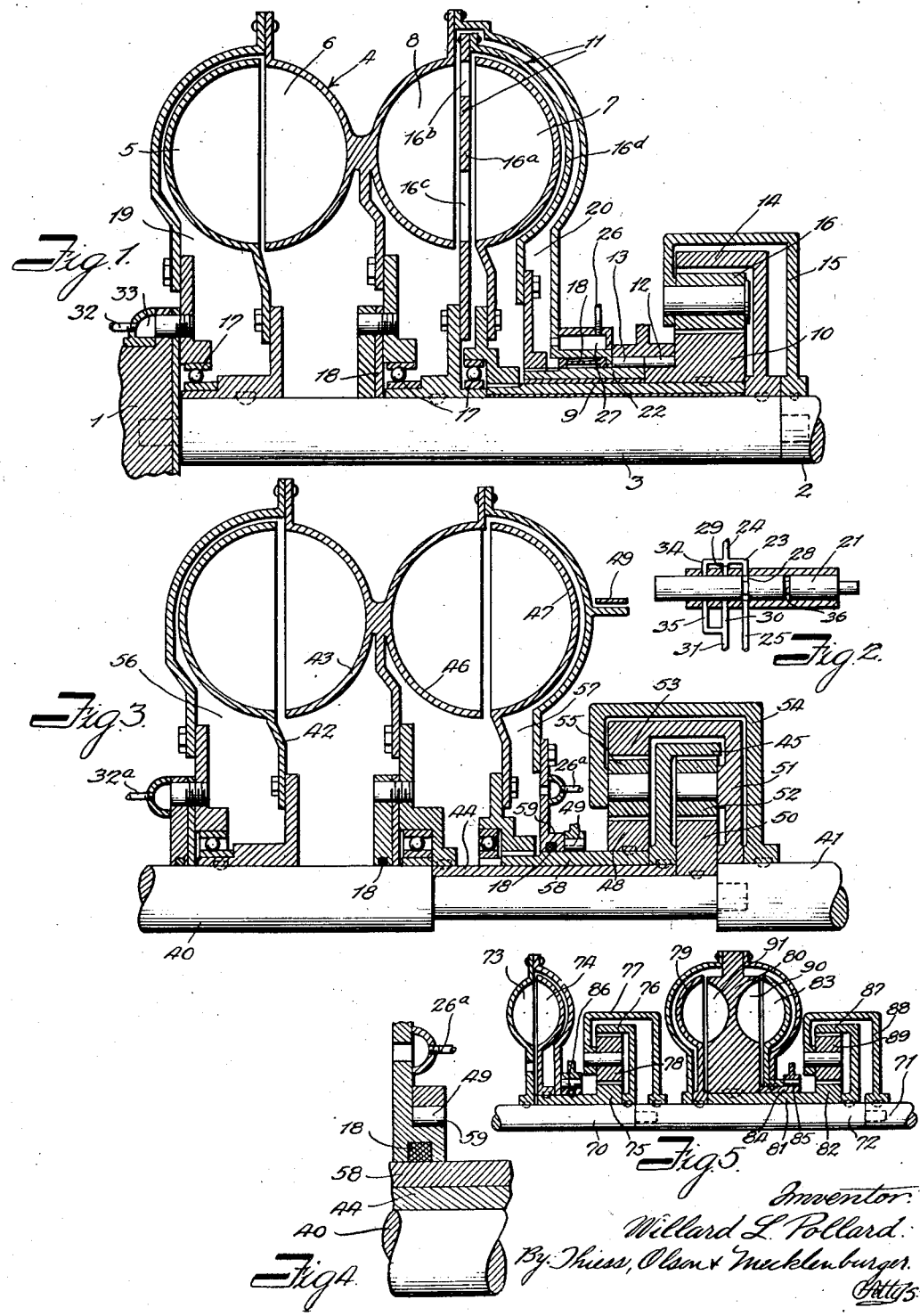

2,437,333

UNITED STATES PATENT OFFICE 2,437,333

TRANSMISSION

Willard L. Pollard, Evanston, Ill.

Application August 29, 1942, Serial No. 456,594

7 Claims. (Cl. 74—189.5)

My invention relates to transmissions.

An object of my invention is to provide an improved hydro planetary transmission capable of having a plurality of different torque ratios with provision for changing smoothly from one ratio to another.

A further object is to provide such a construction which will be relatively simple in operation, inexpensive to manufacture and durable in use.

A further object is to provide such a construction in which a change of ratio is effected without the use of direct-contact friction-gripping means or dog clutches.

A further object is to provide such a construction which will enable the motor to idle without causing the car to creep.

A further object is to provide such a construction which will hold the car against backing down on upgrades.

A further object is to provide such a construction which will provide a simple, continuous power flow.

A further object is to provide such a construction in which a substantial proportion of the power may be by-passed around the hydraulic part of the transmission.

Further objects and advantages of the invention will be apparent from the description and claims.

In the drawings, in which several forms of my invention are shown,

Figure 1 is an axial sectional view of a hydraulic planetary transmission;

Fig. 2 is an axial sectional view of a control valve;

Fig. 3 is an axial sectional view showing another form of transmission;

Fig. 4 is an enlarged detail view showing a modification of Fig. 2; and

Fig. 5 is an axial sectional view showing another form.

Referring first to Figs. 1 and 2, the construction shown comprises a rotary drive member 1, a driven shaft 2, an intermediate shaft 3, a duplex pump rotor 4 secured to rotate with the drive member 1, a turbine rotor 5 secured to the intermediate shaft 3 and driven from the front pump rotor 6, a turbine rotor 7 driven from the rear pump rotor 8 and secured to a sleeve 9 on which the sun gear 10 is keyed, a fluid-transmitting torque-transmitting rotor 11 keyed to the intermediate shaft 3, a one-way anchorage device 12 for preventing reverse rotation of the sun gear, a one-way anchorage device 13 for preventing reverse rotation of the torque-transmitting fluid-transmitting rotor 11, a ring gear 14 secured to the intermediate shaft 3, a gear carrier 15 secured to rotate with the driven shaft 2, and planet gearing 16 carried by the gear carrier and meshing with the sun gear and ring gear. The rotor 11 may be of the type shown in my copending application Serial No. 410,815, filed September 15, 1941, now Patent #2,322,251, June 22, 1943, comprising a circular plate 16a having two concentric series of circumferential openings 16b and 16c therein for the passage of liquid between the rotors 7 and 8 and a circular dished rotor 16d connecting the plate 16a with the sleeve 22. Suitable antifriction bearings 17 are provided between the various rotors. Suitable leak stops 18 are provided to prevent the escape of liquid from the hydraulic part of the transmission.

Suitable means are provided for filling and emptying the chambers 19 and 20. Such filling and emptying devices are old and well known in this art and need not be described in detail. The filling and emptying of the two liquid chambers are controlled by the valve construction shown in Fig. 2, as described more in detail hereinafter. This valve mechanism can be operated so that both liquid chambers will be empty in one position of the valve 21; so that the rear chamber 20 will be full and the front chamber 19 empty in another position of the valve; so that the front chamber 19 will be full and the rear chamber 20 empty in another position of the valve, and so that both chambers will be full in another position of the valve.

In the first position of the valve, with both chambers empty, no torque will be transmitted. In the second position, with the rear chamber full and the front chamber empty, no torque will be transmitted to the ring gear 14, which, however, will be held against reverse rotation by the one-way anchorage device 13 acting through the sleeve 22, the torque-transmitting rotor 11 and the intermediate shaft 3. The sun gear 10 will be rotated since the rear chamber 20 is full of liquid and the rear hydraulic coupler is active and effective. This will give a relatively low speed depending upon the ratio between the sun gear 10 and the ring gear 14. In the third position of the valve, with the rear chamber 20 empty and the front chamber 19 full, no torque will be exerted on the sun gear which, however, will be held against reverse rotation by the one-way anchorage device 12. Torque will be exerted on the ring gear 14 from the pump rotor 6 to the turbine rotor 5 and intermediate shaft 3. This will give an intermediate speed ratio, depending on the ratio between the ring gear 14 and the sun gear 10. In the fourth position of the valve, both chambers will be full of liquid and both the sun gear and ring gear will be driven, the sun gear being driven from the rear pump rotor 8 of the turbine rotor 7 and the ring gear being driven from the front turbine rotor 5.

Referring somewhat in detail to the valve shown in Fig. 2, let it be assumed that the slide valve 21 is in the second position, for low gear, in which it connects a branch 23 of the conduit 24 with the conduit 25 and that the conduit 25 is connected with a conduit 26 leading to the annular supply chamber 27 for the rear fluid chamber 20. Let it be assumed that if the slide valve is moved one step to the left, it will bring the annular passage 28 into registration with the branches 29 and 30, which will connect the conduit 24 with the conduit 31 leading to the conduit 32 connected with the annular supply passage 33 for the front liquid chamber 19. Further let it be assumed that if the slide valve 21 is moved two steps to the left from the position shown, it will bring the annular passage 28 into registration with the branch 34 of the conduit 29 and with the branch 35 of the conduit 31 and will bring the annular passage 36 into registration with the branch 23 and with the conduit 25 which is connected with the conduit 26. Let it also be assumed that if the slide valve 21 is moved from the position shown one step to the right, none of the conduits 25 and 31 will be in communication with the conduit 24. Further let it be assumed that when the conduit 24 is in communication with the conduit 25, the rear liquid chamber 20 will be filled and, when not in communication, the rear chamber will be empty. Let it also be assumed that when the conduit 24 is in communication with the conduit 31, the front liquid chamber 19 will be filled and, when not in communication, the front chamber 19 will be empty.

Under these conditions, it will be seen that when the slide valve is in the position shown, the front chamber 19 will be empty and the rear chamber 20 will be full and the transmission will be in low gear; that if the valve is moved one step to the left, the front chamber will be full and the rear chamber empty and the transmission will be in intermediate gear, and that if the valve is moved two steps to the left, the transmission will be in high gear or direct drive. If the slide valve is moved one step to the right from the position shown, none of the conduits 25 and 31 will be in communication with the conduit 24, both chambers 19 and 20 will be empty and no power will be transmitted. It will be noted, however, that the one-way anchorage devices 12 and 13 would prevent the car from backing downhill if it were stopped on an upgrade by preventing reverse rotation of the sun gear 10 and ring gear 14 and hence of the gear carrier 15 and driven propeller shaft 2. It will be seen that this construction provides three usable gear ratios, using a simple planetary in combination with a simple hydraulic power transmitter without the use of friction clutches or dog clutches and obtaining continuous power flow.

The construction shown in Fig. 3 comprises a drive shaft 40, a driven shaft 41, a front pump rotor 42 keyed to the drive shaft 40, a front turbine rotor 43 keyed to the sleeve 44 on which the ring gear 45 is keyed, a rear pump rotor 46 driven from and rotatable with the front turbine rotor 43, a rear turbine rotor 47 driven from the rear pump rotor 46 and keyed to the sun gear 48, a one-way anchorage 49 for holding the sun gear 48 against rotation, a sun gear 50 keyed to the drive shaft 40, a gear carrier 51 rotatable on the driven shaft 41, planet gearing 52 meshing with the sun gear 50 and ring gear 45, a ring gear 53 rotatable with the gear carrier 51, a gear carrier 54 keyed to the driven shaft 41, and planet gearing 55 carried by the gear carrier 54 and meshing with the sun gear 48 and ring gear 53.

Means are provided for filling and emptying the liquid chambers 56 and 57 from the front and rear couplers which may, in general, be similar to the means for filling and emptying described in connection with Figs. 1 and 2. The conduits 26a and 32a correspond to the conduits 26 and 32, respectively, of Fig. 1. Suitable leak stops 18 may be provided as in Fig. 1. With this construction, a number of conditions can exist with respect to the filling and emptying of the liquid chambers: (1) Both may be empty in one condition; (2) the front one may be empty and the rear one full in another condition; (3) the front one may be full and the rear one empty in another condition, and (4) both may be full in another condition. Under the first condition, there will, of course, be no torque exerted on either the turbine 43 or the turbine 47 so that parts of the planetary mechanism will revolve idly. Under the second condition, with the front chamber empty and the rear chamber full, the driven shaft 41 may remain stationary at slow speeds of the drive shaft, the sun gear 50 rotating with the shaft 40, the sun gear 48 being held against rotation by the one-way anchor 49 and the rotors 43 and 46 revolving at a relatively slow speed in a reverse direction, which reverse rotation will be resisted to some extent by the turbine rotor 47 which is held against reverse rotation by the one-way anchor 49. However, if the motor picks up above idling speed, the speed of the reverse rotation of the pump rotor 46 will become so great that the drag exerted by the stationary turbine rotor 47 will cause sufficient resistance to the reverse rotation of the pump rotor 46 to cause the driven shaft to start rotating. With the gear proportions shown, the torque ratio of drive shaft to driven shaft under these conditions will be about .28 to 1.

If, now, the front chamber is filled with liquid, so that both chambers are full and the fourth condition exists, the rotors 43 and 46 will slow up their reverse direction, come to a standstill and then go into a forward rotation. At the instant of transition from reverse to forward rotation, the ratio of drive shaft torque to driven shaft torque, with the gear proportions shown, will be about .4. If the speed of the motor continues to increase, the speed of the rotors 43 and 46 will increase to a point at which the second turbine rotor 47 will start to rotate, and if the speed still continues to pick up, the transmission will go into substantially a direct drive.

If it should be desired to obtain a sudden burst of power, the rear coupler could be emptied of liquid, resulting in the third condition, whereupon the tubular shaft 58 and sun gear 48 would slip back onto the one-way anchorage 49 and the rear coupler would then be eliminated as a factor, power flow from the drive shaft 40 to the driven shaft 41 being divided, part going through the hydraulic part of the transmission and part being by-passed. With the proportions shown, the torque ratio under these conditions between the drive shaft and the propeller shaft would be approximately .7 to 1.

In low gear, approximately 40 per cent of the power is by-passed around the hydraulic part of the transmission; also at intermediate gear, approximately 40 per cent is by-passed. In high gear, approximately 28 per cent is by-passed. The rear coupler never has to handle more than .3 of the motor torque, and the front coupler never has to handle more than 72 per cent of the motor torque. This enables the rear coupler to be made relatively small. In order to slow down in going downhill when the car is driving the motor, a brake 49 may be provided which can be applied to hold the rotors 43 and 46 and the gear 45 against rotation, both chambers 56 and 57 being filled. Under this condition, the rotors 43 and 46 will act as a drag on the rotors 42 and 47, respectively, and hence will act as a drag on the gears 50 and 48, respectively.

In Fig. 4 is shown a modification of the construction shown in Fig. 3, the one-way anchorage device 49 being shifted from engagement with the sleeve 58 of the sun gear 48 to engagement with a hub portion 59 on the combination turbine and pump rotor 43 and 46, the rest of the structure of Fig. 2 being unchanged. With this construction, with both chambers 56 and 57 empty, no torque will be transmitted by either of the hydraulic couplers, and certain of the planetary gears will rotate idly without transmitting any torque from the drive shaft to the driven shaft. If the front chamber is empty and the rear chamber is full, the one-way anchorage 49 will hold the ring gear 45 against reverse rotation and the sun gear 50 will be driven directly by the motor. This will cause the cage 51 and ring gear 53 to revolve at a relatively low speed, depending upon the ratio of the sun gear and ring gear. This rotation of the ring gear 53 will cause a reverse rotation of the sun gear 48 and rotor 47, due to the resistance of the driven shaft 41 acting through the gear carrier 54 and planet gearing 55. This reverse rotation of the rotor 47 and sun gear 48 will be resisted by the drag exerted on the turbine rotor by the pump rotor 46, which is held against reverse rotation by the one-way anchor 49. This resistance to reveres rotation of the sun gear 48 will cooperate with the action of the ring gear to cause the gear carrier 54 to rotate in a forward direction carrying with it the driven shaft 51. This will give a torque multiplication of about 4.5. If, now, both chambers are filled with liquid, the pump rotor 42 will cause the turbine rotor 43 to start rotating, carrying with it the ring gear 45. As the first turbine rotor 43 increases in speed, the second pump rotor 46 increases in speed also and will eventually cause the second turbine rotor 47 to start rotating. The turbine rotors 43 and 47 may increase in speed until both are rotating at slightly less speed than the drive shaft 40.

The construction shown in Fig. 5 comprises a drive shaft 70, a driven shaft 71, an intermediate shaft 72, a pump rotor 73 keyed to the drive shaft 70, a turbine rotor 74 keyed to the sun gear 75, a ring gear 76 keyed to the drive shaft 70, a gear carrier 77 keyed to the intermediate shaft 72, planet gearing 78 carried by the gear carrier 77 and meshing with the sun gear 75 and ring gear 76, a pump rotor 79 keyed to the intermediate shaft 72, a combination turbine and pump rotor 80 keyed to the sleeve 81 on which the sun gear 82 is secured, a turbine rotor 83 keyed to a sleeve 84 which is held against reverse rotation by the one-way anchorage 85, a one-way anchorage 86 for holding the sun gear 75 against reverse rotation, a ring gear 87 secured to the intermediate shaft 72, a gear carrier 88 keyed to the driven shaft 71 and planet gearing 89 carried by the gear carrier 88 and meshing with the sun gear 82 and ring gear 87.

Means may be provided for filling and emptying the liquid chamber of the front coupler 73, 74. When both liquid chambers are full and the motor is put in operation and picks up in speed, the ring gear 76 will rotate with the motor shaft 70 and the sun gear 75 will be held against reverse rotation by the one-way anchorage 86 until the drag of the pump 73 on the turbine 74 starts the sun gear 75 to rotating. This will cause rotation of the gear carrier 77, intermediate shaft 72 and ring gear 87. The rotation of the ring gear will first cause reverse rotation of the sun gear 82 due to the resistance to motion of the driven shaft 71 and gear carrier 88. This reverse rotation of the sun gear 82 will be resisted by the dragging action of the turbine rotor 83 on the pump rotor 80, the turbine rotor 83 being held against reverse rotation by the one-way anchorage 85. It will be seen that at first there will be two speed reductions in series so that the total speed reduction will be the product of the two speed reductions.

As the pump rotor 73 picks up in speed, it will start the turbine rotor 74 to rotating and with it the sun gear 75. The turbine rotor 74 will continue to pick up in speed until its speed approximates that of the pump rotor 73. This will cause the speed of the gear carrier 77 to increase and with it the speed of the pump rotor 79 and ring gear 87. As the speed of this pump rotor 79 increases, it will exert an increasing pull on the turbine 81 to slow up the reverse rotation of the turbine and pump rotor 80, cause it to come to a standstill and then rotate in the same direction as that of the pump rotor 79. As soon as the combination turbine and pump rotor 80 starts to rotate in a forward direction, the turbine rotor 83 will free itself from the one-way anchorage 85 and rotate idly along with the combination rotor 80. Under ordinary conditions, the turbine speeds will continue to increase until they approximate the speeds of the pump rotors and the entire transmission rotates substantially as a unit.

If desired, means may be provided similar to those disclosed in connection with Figs. 1 and 2 for filling and emptying the front liquid chamber when desired. If the front chamber is emptied, the front coupler is disabled and the sun gear 75 falls back onto the one-way anchorage 86, thus effecting a direct gear drive between the drive shaft and the intermediate shaft.

It will be noted that in both the front coupler and the rear coupler, substantially two-thirds of the power is by-passed around the hydraulic part of the transmission.

Further modifications will be apparent to those skilled in the art and it is desired, therefore that

Having thus described my invention, what I claim and desire to secure by Letters Patent is:

1. A hydro planetary transmission comprising rotatable drive means, pump rotor means driven from said drive means, turbine rotor means driven from said pump rotor means, planetary gearing comprising a first gear, a second gear coaxial therewith, and means in force-transmitting relation between said gears including a gear carrier and planet gearing carried by said carrier, said pump rotor means and turbine rotor means comprising a first pump rotor driven positively by said drive means, a first turbine rotor drivable by said first pump rotor, a second pump rotor driven positively by said first turbine rotor, and a second turbine rotor drivable by said second pump rotor, said second gear being driven positively from said first turbine, said first gear being driven positively from said drive means, means for holding said second turbine against reverse rotation with respect to the direction of its pump driven rotation, a third gear driven by said second turbine, a fourth gear driven by said gear carrier, a second gear carrier, and planet gearing carried by said second gear carrier and meshing with said third and fourth gears.

2. A hydro planetary transmission comprising rotatable drive means, pump rotor means driven from said drive means, turbine rotor means driven from said pump rotor means, planetary gearing comprising a first gear, a second gear coaxial therewith, and means in force-transmitting relation between said gears including a gear carrier and planet gearing carried by said carrier, said turbine rotor means including two independently rotatable turbines, means for supplying and withdrawing drive liquid with respect to either turbine selectively and for supplying and withdrawing drive liquid with respect to both turbines collectively, said first gear being driven by one of said turbines, said second gear being driven by the other of said turbines, and one-way anchorage means for holding each gear against reverse rotation with respect to its direction of driven rotation when the driving liquid is withdrawn from its driving turbine.

3. A hydro planetary transmission comprising rotatable drive means, pump rotor means driven from said drive means, turbine rotor means driven from said pump rotor means, planetary gearing comprising a first gear, a second gear coaxial therewith, and means in force-transmitting relation between said gears including a gear carrier and planet gearing carried by said carrier, said turbine rotor means including two independently rotatable turbines, means for supplying and withdrawing drive liquid with respect to either turbine selectively and for supplying and withdrawing drive liquid with respect to both turbines collectively, said first gear being driven by one of said turbines, said second gear being driven by the other of said turbines, and means for holding each gear against reverse rotation with respect to its direction of driven rotation when the driving liquid is withdrawn from its driving turbine.

4. A hydro planetary transmission comprising rotatable drive means, pump rotor means driven from said drive means, turbine rotor means driven from said pump rotor means, planetary gearing comprising a first gear, a second gear coaxial therewith, and means in force-transmitting relation between said gears including a gear carrier and planet gearing carried by said carrier, said turbine rotor means including two independently rotatable turbines, means for supplying and withdrawing drive liquid with respect to either turbine selectively and for supplying and withdrawing drive liquid with respect to both turbines collectively, said first gear being driven by one of said turbines, said second gear being driven by the other of said turbines, and means for holding each gear against reverse rotation with respect to its direction of driven rotation when the driving liquid is withdrawn from its driving turbine, said holding means comprising a liquid-transmitting torque-transmitting rotor extending across the spaces between the pump rotor means and one of said turbines and connected with one of said gears.

5. A hydro planetary transmission comprising a rotatable drive member, a pump rotor positively driven from said drive member, a gear positively driven from said drive member, a turbine rotor impositively driven from said pump rotor, a second gear positively driven from said turbine rotor, a one-way anchorage for preventing reverse rotation of said turbine driven gear, a gear carrier, planet gearing carried by said gear carrier and in force-transmission relation with respect to both said gears, a second pump rotor driven positively from said gear carrier, a third gear driven positively from said gear carrier, a second turbine rotor driven impositively from said second pump rotor, a fourth gear driven positively from said second turbine rotor, a third pump rotor driven positively from said second turbine rotor, a third turbine rotor driven impositively from said third pump rotor, a one-way anchorage for preventing reverse rotation of said third turbine rotor, a gear carrier, and planet gearing carried by said carrier and in force-transmission relation with respect to said third and fourth gear.

6. A hydro planetary transmission comprising rotatable drive means, hydraulic torque transmission means, planetary gearing comprising a first gear, a second gear coaxial therewith, and means in force-transmitting relation between said gears including a gear carrier and planet gearing carried by said carrier, said hydraulic torque transmission means comprising a first pump rotor driven positively by said drive means, a first turbine rotor drivable by said first pump rotor, a second pump rotor driven positively by said first turbine rotor, and a second turbine rotor drivable by said second pump rotor, said second gear being driven positively from said first turbine, said first gear being driven positively from said drive means, and one-way anchorage means for holding said second turbine against reverse rotation with respect to the direction of its pump driven rotation.

7. A hydro planetary transmission comprising rotatable drive means, hydraulic torque transmission means, planetary gearing comprising a first gear, a second gear coaxial therewith, and means in force-transmitting relation between said gears including a gear carrier and planet gearing carried by said carrier, said hydraulic torque transmission means comprising a first pump rotor driven positively by said drive means, a first turbine rotor drivable by said first pump rotor, a second pump rotor driven positively by said first turbine rotor, and a second turbine rotor drivable by said second pump rotor, said second gear being driven positively from said first turbine, said first gear being driven positively from said drive means, and means for holding said second turbine against reverse rotation with respect to the direction of its pump driven rotation.

WILLARD L. POLLARD.

REFERENCES CITED

The following references are of record in the file of this patent:

UNITED STATES PATENTS

| Number | Name | Date |
|---|---|---|
| 2,078,287 | Seibold | Apr. 27, 1937 |
| 2,081,863 | Duffield | May 25, 1937 |
| 2,144,256 | Duffield | Jan. 17, 1939 |
| 2,147,528 | Fottinger | Feb. 14, 1939 |
| 2,158,557 | Lammeren | May 16, 1939 |
| 2,309,912 | Lazaga | Feb. 2, 1943 |
| 2,322,251 | Pollard | June 22, 1943 |
| 2,341,512 | Burtnett | Feb. 15, 1944 |
| 2,343,509 | Jandasek | Mar. 7, 1944 |

FOREIGN PATENTS

| Number | Country | Date |
|---|---|---|
| 464,570 | Great Britain | Apr. 19, 1937 |
| 464,775 | Great Britain | Apr. 23, 1937 |